: US 12,309,709 B2
(45) Date of Patent: May 20, 2025

(54) UPLINK FULL-POWER TRANSMISSION METHOD AND DEVICE

(71) Applicant: VIVO MOBILE COMMUNICATION CO., LTD., Guangdong (CN)

(72) Inventors: Xiaodong Sun, Chang'an Dongguan (CN); Rakesh Tamrakar, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 576 days.

(21) Appl. No.: 17/586,318

(22) Filed: Jan. 27, 2022

(65) Prior Publication Data
US 2022/0150841 A1 May 12, 2022

Related U.S. Application Data

(63) Continuation of application No. PCT/CN2020/103592, filed on Jul. 22, 2020.

(30) Foreign Application Priority Data

Aug. 7, 2019 (CN) .......................... 201910727566.7

(51) Int. Cl.
*H04W 52/14* (2009.01)
*H04L 5/00* (2006.01)
*H04W 52/36* (2009.01)

(52) U.S. Cl.
CPC ......... *H04W 52/146* (2013.01); *H04L 5/0048* (2013.01); *H04W 52/367* (2013.01)

(58) Field of Classification Search
CPC . H04W 52/146; H04W 52/367; H04W 52/36; H04W 52/38; H04L 5/0048
See application file for complete search history.

(56) References Cited

U.S. PATENT DOCUMENTS

2014/0153433 A1* 6/2014 Zhou ................... H04W 72/542 370/252
2017/0347327 A1* 11/2017 Rahman ............. H04W 52/362
2021/0314873 A1* 10/2021 Huang ................. H04W 52/42

FOREIGN PATENT DOCUMENTS

CN 101674642 A 3/2010
CN 101959200 A 1/2011
(Continued)

OTHER PUBLICATIONS

CATT: "Full Tx power UL transmission" 3GPP Draft; R1-1902021, 3rd Generation Partnership Project (3GPP). vol. RAN WG1, No. Athens, Greece; Feb. 25-Mar. 1, 2019 Feb. 16, 2019 (Feb. 16, 2019), XP051599716. (Year: 2019).*

(Continued)

*Primary Examiner* — John J Lee
(74) *Attorney, Agent, or Firm* — BROOKS KUSHMAN P.C.

(57) ABSTRACT

Embodiments of this disclosure disclose an uplink full-power transmission method and a device. The method is applied to a terminal device and includes: performing uplink transmission based on an uplink transmit power obtained through scaling by a power scaling coefficient, where the power scaling coefficient is determined based on a power control factor, and the power control factor includes at least one of the following: an uplink full-power transmission capability of the terminal device, a supported transmission precoding matrix indicator TPMI reported by the terminal device, a TPMI delivered by a network device, a working mode reported by the terminal device, or the number of antenna ports for each SRS resource in a sounding reference signal SRS resource set that is configured by the network device based on the working mode.

18 Claims, 4 Drawing Sheets

(56) References Cited

FOREIGN PATENT DOCUMENTS

| CN | 102547949 A | 7/2012 |
|---|---|---|
| CN | 103037488 A | 4/2013 |
| EP | 3481113 A1 | 5/2019 |

OTHER PUBLICATIONS

"Full Tx power UL transmission" 3GPP TSG RAN WG1 Meeting #96, CATT, R1-1902021, Feb. 25, 2019.
"Discussions on full Tx power uplink transmission" 3GPP TSG RAN WG1 #96bis, LG Electronics, R1-1904210, Apr. 8, 2019.
"Full TX Power UL transmission" 3GPP TSG RAN WG1 Meeting #97, ZTE, R1-1907561, May 13, 2019.
IN Office Action in Application No. 202227010017 Dated Jul. 21, 2022.
European Search Report in Application No. 20849184.5 Dated Sep. 13, 2022.
CN Office Action in Application No. 201910727566.7 Dated Apr. 6, 2021.
"Full Tx power for UL transmissions" 3GPP TSG RAN WG1 #97, Qualcomm Incorporated, R1-1907291, May 13, 2019.
"Feature lead summary on Full TX Power UL transmission" 3GPP TSG RAN WG1#97, vivo, R1-1907671, May 13, 2019.
Written Opinion and International Search Report in Application No. PCT/CN2020/103592 Dated Oct. 27, 2020.
First Office Action for Japanese Application No. 2023-083146, dated Feb. 9, 2024, 4 Pages.
Ericsson "On full power UL transmission" 3GPP TSG RAN WG1 Meeting #97, Reno, USA, May 2019, R1 1907184, 23 Pages.

\* cited by examiner

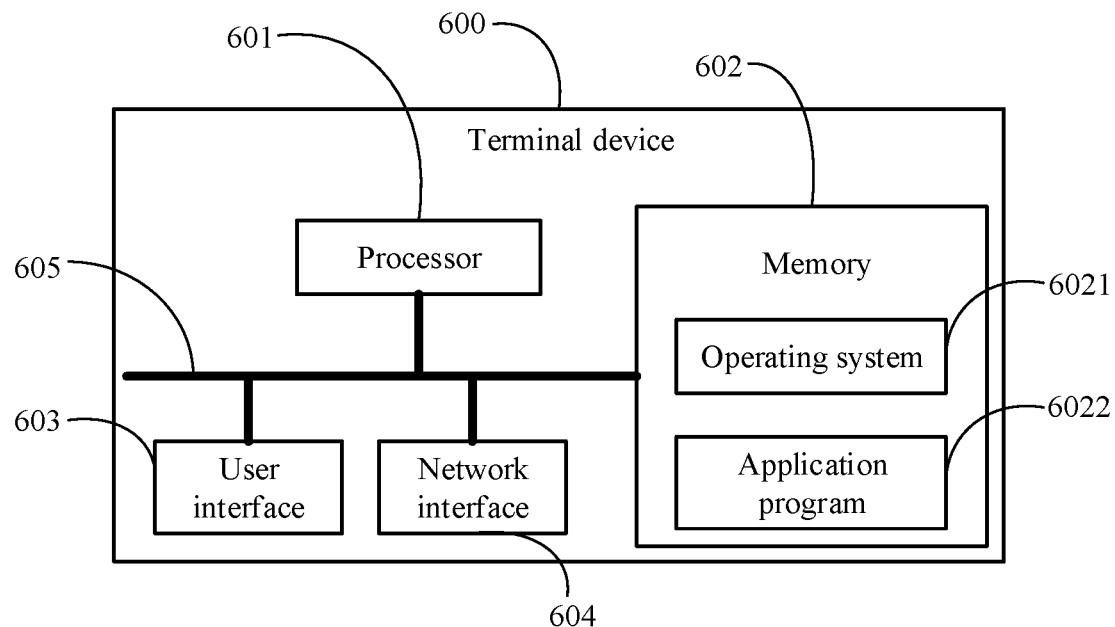

FIG. 6

If none of radio frequency branches of a terminal device supports full-power transmission or part of radio frequency branches supports full-power transmission, deliver a TPMI to the terminal device, where the delivered TPMI is used to indicate that the terminal device is to perform uplink transmission based on a precoding codebook that is determined based on an uplink transmission parameter ⟶ S701

FIG. 7

UPLINK FULL-POWER TRANSMISSION METHOD AND DEVICE

This application is a continuation application of International Application No. PCT/CN2020/103592 filed on Jul. 22, 2020, which claims priority to Chinese Patent Application No. 201910727566.7, filed with the China National Intellectual Property Administration on Aug. 7, 2019 and entitled "UPLINK FULL-POWER TRANSMISSION METHOD AND DEVICE", which are incorporated herein by reference in their entireties.

TECHNICAL FIELD

This disclosure relates to the field of wireless communications technologies, and in particular, to an uplink full-power transmission method and a device.

BACKGROUND

In NR (New Radio) Rel 15, a physical uplink shared channel (PUSCH) supports codebook-based transmission and non-codebook-based transmission, imposing higher requirements for implementation of PUSCH power control. Codebook-based transmission means that a user terminal (User Equipment, UE) selects a precoding codebook according to an indication of a network side; non-codebook-based transmission means that the UE may dynamically determine a precoding codebook based on channel state information (CSI).

For codebook-based PUSCH transmission, when the number of sounding reference signal (SRS) antenna ports configured for codebook-based transmission by the network side is greater than 1, a PUSCH power may be scaled based on a ratio of the number of non-zero PUSCH antenna ports to the maximum number of SRS antenna ports supported by a single SRS resource of the UE, and then is divided equally among the non-zero PUSCH antenna ports. For non-codebook-based PUSCH transmission, or for codebook-based PUSCH transmission in which the number of SRS antenna ports used for codebook-based transmission is equal to 1, a PUSCH power may be divided equally among non-zero PUSCH antenna ports.

The foregoing PUSCH power scaling behavior for codebook-based transmission may cause uplink non-full-power sending. For example, when the network side configures that the UE uses partial transmission precoding matrix indicator (TPMI) for transmission $$\left(\text{such as } \frac{1}{\sqrt{2}}\begin{bmatrix}1\\0\end{bmatrix}\right),$$

the UE is unable to perform full-power sending, thereby affecting uplink coverage to cause limited uplink coverage.

SUMMARY

According to a first aspect, an embodiment of this disclosure provides an uplink full-power transmission method. The method is applied to a terminal device and includes: performing uplink transmission based on an uplink transmit power obtained through scaling by a power scaling coefficient, where the power scaling coefficient is determined based on a power control factor, and the power control factor includes at least one of the following: an uplink full-power transmission capability of the terminal device, a supported transmission precoding matrix indicator TPMI reported by the terminal device, a TPMI delivered by a network device, a working mode reported by the terminal device, or the number of antenna ports for each SRS resource in a sounding reference signal SRS resource set that is configured by the network device based on the working mode.

According to a second aspect, an embodiment of this disclosure further provides an uplink full-power transmission method. The method is applied to a network device and includes: receiving uplink data sent by a terminal device, where the uplink data is transmitted on uplink by the terminal device based on an uplink transmit power obtained through scaling by a power scaling coefficient, the power scaling coefficient is determined based on a power control factor, and the power control factor includes at least one of the following: an uplink full-power transmission capability of the terminal device, a supported transmission precoding matrix indicator TPMI reported by the terminal device, a TPMI delivered by the network device, a working mode reported by the terminal device, or the number of antenna ports for each SRS resource in a sounding reference signal SRS resource set that is configured by the network device based on the working mode.

According to a third aspect, an embodiment of this disclosure further provides a terminal device. The terminal device includes: a transmission module, configured to: perform uplink transmission based on an uplink transmit power obtained through scaling by a power scaling coefficient, where the power scaling coefficient is determined based on a power control factor, and the power control factor includes at least one of the following: an uplink full-power transmission capability of the terminal device, a supported transmission precoding matrix indicator TPMI reported by the terminal device, a TPMI delivered by a network device, a working mode reported by the terminal device, or the number of antenna ports for each SRS resource in a sounding reference signal SRS resource set that is configured by the network device based on the working mode.

According to a fourth aspect, an embodiment of this disclosure further provides a network device. The network device includes: a receiving module, configured to receive uplink data sent by a terminal device, where the uplink data is transmitted on uplink by the terminal device based on an uplink transmit power obtained through scaling by a power scaling coefficient, the power scaling coefficient is determined based on a power control factor, and the power control factor includes at least one of the following: an uplink full-power transmission capability of the terminal device, a supported transmission precoding matrix indicator TPMI reported by the terminal device, a TPMI delivered by the network device, a working mode reported by the terminal device, or the number of antenna ports for each SRS resource in a sounding reference signal SRS resource set that is configured by the network device based on the working mode.

According to a fifth aspect, an embodiment of this disclosure further provides a terminal device, including a memory, storing a computer program instruction; and a processor, where when the computer program instruction is executed by the processor, the uplink full-power transmission method according to the first aspect is implemented.

According to a sixth aspect, an embodiment of this disclosure further provides a network device, including a memory, storing a computer program instruction; and a processor, where when the computer program instruction is executed by the processor, the uplink full-power transmission method according to the second aspect is implemented.

According to a seventh aspect, an embodiment of this disclosure further provides a computer-readable storage medium, where the computer-readable storage medium includes an instruction, and when the instruction is run on a computer, the computer executes the uplink full-power transmission method according to the first aspect or the second aspect.

BRIEF DESCRIPTION OF DRAWINGS

To describe the technical solutions in the embodiments of this disclosure or in the related art more clearly, the following briefly describes the accompanying drawings required for describing the embodiments or the related art. Apparently, the accompanying drawings in the following description show merely some embodiments recorded in this disclosure, and a person of ordinary skill in the art may still derive other drawings from these accompanying drawings.

FIG. 6 is a schematic structural diagram of a terminal device according to another embodiment of this disclosure; and FIG. 7 is a schematic flowchart of an uplink full-power transmission method according to another embodiment of this disclosure.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The technical solutions in the embodiments of this disclosure may be applied to various communications systems, such as a global system for mobile communications (GSM), a code division multiple access (CDMA) system, a wideband code division multiple access (WCDMA) system, a general packet radio service (GPRS) system, a long term evolution (LTE) system, or a new radio (NR) system.

A user terminal (User Equipment, UE) may also be referred to as a mobile terminal, an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

A network device may be a device used for communicating with a mobile device. The network device may be a base station (BTS) in global system for mobile communications (GSM) or CDMA, or may be a base station (NodeB, NB) in WCDMA, or may be an eNB or evolved base station (Evolved Node B, eNodeB), an access point, an in-vehicle device, or a wearable device in LTE, or a network-side device in a future 5G network, or a network device in a future evolved PLMN network.

Figure 1:
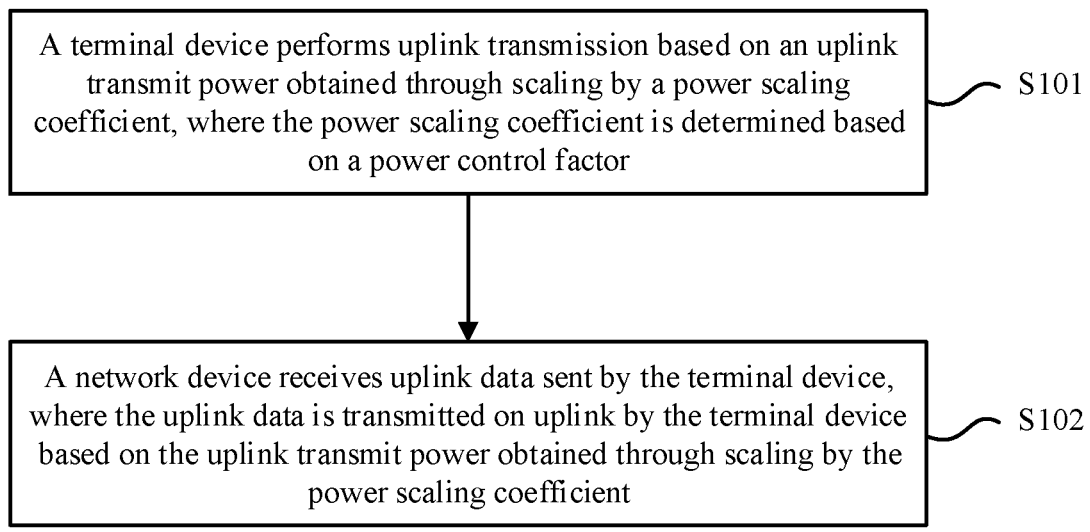
FIG. 1 is a schematic flowchart of an uplink full-power transmission method according to an embodiment of this disclosure.

FIG. 1 is a flowchart of an uplink full-power transmission method according to an embodiment of this disclosure. The method in FIG. 1 is applied to a terminal device and a network device, and may include the following steps.

S101: The terminal device performs uplink transmission based on an uplink transmit power obtained through scaling by a power scaling coefficient, where the power scaling coefficient is determined based on a power control factor.

S102: The network device receives uplink data sent by the terminal device, where the uplink data is transmitted on uplink by the terminal device based on the uplink transmit power obtained through scaling by the power scaling coefficient.

In this embodiment, the power control factor includes at least one of the following: an uplink full-power transmission capability of the terminal device, a supported transmission precoding matrix indicator TPMI reported by the terminal device, a TPMI delivered by a network device, a working mode reported by the terminal device, or the number of antenna ports for each SRS resource in a sounding reference signal SRS resource set that is configured by the network device based on the working mode.

The uplink full-power transmission capability of the terminal device includes the following three UE capabilities:
first UE capability: all radio frequency branches of the terminal device support full-power transmission;
second UE capability: none of radio frequency branches of the terminal device supports full-power transmission; and
third UE capability: part of radio frequency branches of the terminal device supports full-power transmission.

The full-power transmission is transmission based on a maximum transmit power of the terminal device.

When the terminal device supports the second UE capability or the third UE capability, the terminal device supports the following two working modes.

Working mode 1: The number of antenna ports for each SRS resource in the SRS resource set configured by the network device is the same (that is, a configuration used for the SRS resource set for codebook-based transmission is the same as that in Rel 15); and in working mode 1, the terminal device implements full-power sending by using the TPMI delivered by the network device.

Working mode 2: The number of antenna ports for each SRS resource in the SRS resource set configured by the network device is different (that is, a configuration used for the SRS resource set for codebook-based transmission is different from that in Rel 15); and in working mode 2, the terminal device implements full-power sending by using the number of antenna ports for an SRS resource configured by the network device.

According to this embodiment of this disclosure, the uplink transmission can be performed based on the uplink transmit power obtained through scaling by the power scaling coefficient, and a plurality of power control factors (including at least one of the uplink full-power transmission capability of the terminal device, the supported transmission precoding matrix indicator TPMI reported by the terminal device, the TPMI delivered by the network device, the working mode reported by the terminal device, or the number of antenna ports for each SRS resource in the sounding reference signal SRS resource set that is configured by the network device based on the working mode) can be considered comprehensively to scale the uplink transmit power. In this way, an uplink transmit power is improved, an uplink coverage is enhanced, and uplink full-power transmission is implemented for the terminal device.

In the foregoing embodiment, a value of the power scaling coefficient that is determined varies with the power control factor. The following describes in detail how to determine the power scaling coefficient based on the power control factor.

Embodiment 1

Assuming that a before-scaling uplink power calculated through uplink power control is P, the power scaling coefficient for uplink transmission is $\alpha$, and the number of non-zero (or non-zero) uplink transmission antenna ports is $\beta$. The non-zero (or non-zero) uplink transmission antenna port means that row values of a precoding codebook corresponding to the antenna port are all non-zero.

When the terminal device supports the first UE capability (for example, all the radio frequency branches of the terminal device support full-power transmission), the power scaling coefficient may be determined to be 1, that is, $\alpha=1$.

After determining the power scaling coefficient $\alpha=1$, the terminal device first scales the uplink power P based on the power scaling coefficient $\alpha$, and then performs equal division among the non-zero uplink transmission antenna ports to obtain an uplink transmit power (actual transmit power) P' of each uplink transmission antenna port:

$$P' = P*\alpha/\beta$$

Embodiment 2

Assuming that a before-scaling uplink power calculated through uplink power control is P, the power scaling coefficient for uplink transmission is $\alpha$, and the number of non-zero (or non-zero) uplink transmission antenna ports is $\beta$. The non-zero (or non-zero) uplink transmission antenna port means that row values of a precoding codebook corresponding to the antenna port are all non-zero, and may be referred to as the number of non-zero antenna ports hereinafter.

When the terminal device supports the second UE capability (for example, none of the radio frequency branches of the terminal device supports full-power transmission), a value of the power scaling coefficient $\alpha$ varies with the working mode supported by the UE.

Specifically, when the UE supports the working mode 1 (for example, the terminal device reports the working mode 1, and the number of antenna ports for each SRS resource in the SRS resource set that is configured by the network device based on the working mode reported by the terminal device is the same), the power scaling coefficient $\alpha$ may be determined to be a ratio of the number of non-zero antenna ports to the maximum number of antenna ports that is supported by a single SRS resource and reported by the terminal device.

When the UE supports the working mode 2 (for example, the terminal device reports the working mode 2, and the number of antenna ports for each SRS resource in the SRS resource set that is configured by the network device based on the working mode reported by the terminal device is different), the power scaling coefficient $\alpha$ may be determined to be a ratio of the number of non-zero antenna ports to the maximum number of antenna ports supported by an SRS resource that is configured by the network device.

After determining the power scaling coefficient $\alpha$ by using the method of this embodiment, the terminal device first scales the uplink power P based on the power scaling coefficient $\alpha$, and then performs equal division among the non-zero uplink transmission antenna ports to obtain an uplink transmit power (actual transmit power) P' of each uplink transmission antenna port:

$$P' = P*\alpha/\beta$$

Embodiment 3

Assuming that a before-scaling uplink power calculated through uplink power control is P, the power scaling coefficient for uplink transmission is $\alpha$, and the number of non-zero (or non-zero) uplink transmission antenna ports is $\beta$. The non-zero (or non-zero) uplink transmission antenna port means that row values of a precoding codebook corresponding to the antenna port are all non-zero, and may be referred to as the number of non-zero antenna ports hereinafter.

When the terminal device supports the third UE capability (for example, part of the radio frequency branches of the terminal device supports full-power transmission), a value of the power scaling coefficient $\alpha$ varies with the working mode supported by the UE.

Specifically, when the UE supports the working mode 1 (for example, the terminal device reports the working mode 1, and the number of antenna ports for each SRS resource in the SRS resource set that is configured by the network device based on the working mode reported by the terminal device is the same), the power scaling coefficient $\alpha$ may be determined to be a ratio of the number of non-zero antenna ports to the maximum number of antenna ports that is supported by a single SRS resource and reported by the terminal device.

When the UE supports working mode 2 (for example, the terminal device reports the working mode 2, and the number of antenna ports for each SRS resource in the SRS resource set that is configured by the network device based on the working mode reported by the terminal device is different), a value of the power scaling coefficient may vary, depending on whether the terminal device reports a full-power transmission TPMI and whether a TPMI delivered by the network device falls within the TPMI reported by the terminal device. Specifically, there may be the following three cases:

a. if the terminal device reports no full-power transmission TPMI, the power scaling coefficient $\alpha$ may be determined to be a ratio of the number of non-zero antenna ports to the maximum number of antenna ports that is supported by the SRS resource and configured by the network device;

b. if the terminal device reports a full-power transmission TPMI, and the TPMI delivered by the network device falls within the TPMI reported by the terminal device, the power scaling coefficient may be determined to be 1, that is, α=1; where for example, the TPMI reported by the terminal device is $$\frac{1}{\sqrt{2}}\begin{bmatrix}1\\0\end{bmatrix},$$

and the TPMI delivered by the network device is $$\frac{1}{\sqrt{2}}\begin{bmatrix}1\\0\end{bmatrix};$$

obviously, the TPMI delivered by the network device falls within the TPMI reported by the terminal device, it can be determined in this case that α is equal to 1; and c. if the terminal device reports the full-power transmission TPMI, and the TPMI delivered by the network device does not fall within the TPMI reported by the terminal device, the power scaling coefficient α may be determined to be a ratio of the number of non-zero antenna ports to the maximum number of antenna ports that is supported by a single SRS resource and reported by the terminal device.

For example, the TPMI reported by the terminal device is $$\frac{1}{\sqrt{2}}\begin{bmatrix}1\\0\end{bmatrix},$$

and the TPMI delivered by the network device is $$\frac{1}{\sqrt{2}}\begin{bmatrix}0\\1\end{bmatrix}.$$

Obviously, the TPMI delivered by the network device falls within the TPMI reported by the terminal device, it can be determined in this case that α is equal to a ratio of the number β of non-zero antenna ports to the maximum number of antenna ports that is supported by a single SRS resource and reported by the terminal device.

After determining the power scaling coefficient α by using the method of this embodiment, the terminal device first scales the uplink power P based on the power scaling coefficient α, and then performs equal division among the non-zero uplink transmission antenna ports to obtain an uplink transmit power (actual transmit power) P' of each uplink transmission antenna port:

$$P' = P * \alpha / \beta$$

In any one of the foregoing embodiments, the uplink full-power transmission capability of the terminal device may be determined in the following manner:

(1) the terminal device reports the uplink full-power transmission capability; or (2) the terminal device reports the uplink full-power transmission capability and receives an uplink full-power transmission indication delivered by the network device, where the uplink full-power transmission indication is used to indicate that the terminal device is to use an uplink full-power transmission mode for uplink transmission.

In the manner (2), after receiving the uplink full-power transmission capability reported by the terminal device, the network device delivers the uplink full-power transmission indication to the terminal device. The network device may deliver the uplink full-power transmission indication to the terminal device in any one of the following manners:

manner 1: delivering the uplink full-power transmission indication through radio resource control RRC, medium access control MAC, or downlink control information DCI;

manner 2: delivering a full-power transmission TPMI, and using the TPMI to indicate that the terminal device is to use an uplink full-power transmission mode for uplink transmission; or manner 3: configuring, for the terminal device, an SRS resource corresponding to the precoding codebook, where the number of antenna ports of the configured SRS resource is the same as the number of non-zero antenna ports indicated by the precoding codebook.

Figure 2:
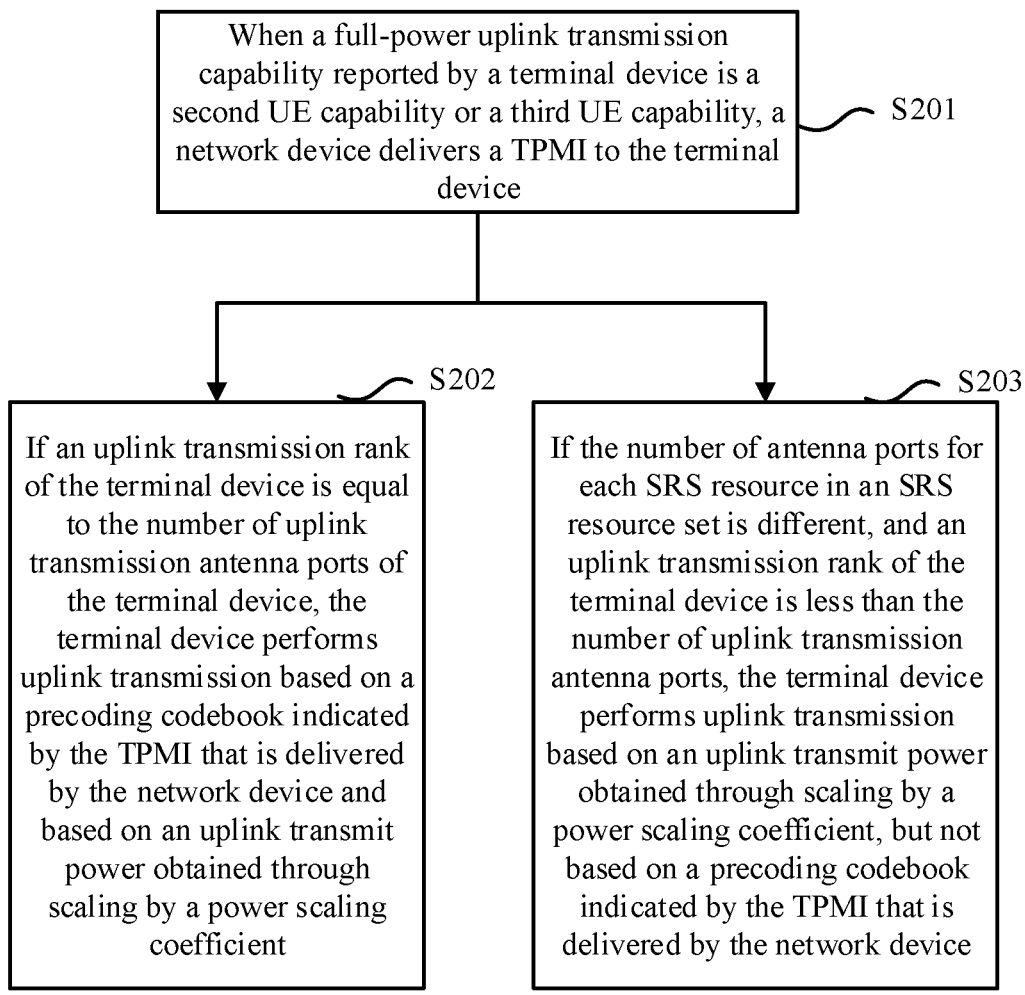
FIG. 2 is a schematic flowchart of an uplink full-power transmission method according to another embodiment of this disclosure.

After the terminal device reports the uplink full-power transmission capability, the network device may perform uplink transmission according to the steps shown in FIG. 2. The method in FIG. 2 may include the following steps.

S201: When the uplink full-power transmission capability reported by the terminal device is the second UE capability or the third UE capability, the network device delivers a TPMI to the terminal device.

The TPMI delivered by the network device is used to indicate that the terminal device is to perform uplink transmission based on a precoding codebook that is determined based on an uplink transmission parameter. The uplink transmission parameter includes the number of uplink transmission antenna ports of the terminal device, the uplink transmission rank, and the number of antenna ports for each SRS resource in the SRS resource set configured by the network device.

S202: If the uplink transmission rank of the terminal device is equal to the number of uplink transmission antenna ports of the terminal device, the terminal device performs uplink transmission based on the precoding codebook indicated by the TPMI that is delivered by the network device and based on the uplink transmit power obtained through scaling by the power scaling coefficient.

The precoding codebook is determined based on the number of uplink transmission antenna ports of the terminal device, the uplink transmission rank, and the number of antenna ports for each SRS resource in the SRS resource set configured by the network device.

S203: If the number of antenna ports for each SRS resource in the SRS resource set is different, and the uplink transmission rank of the terminal device is less than the number of uplink transmission antenna ports, the terminal device performs uplink transmission based on the uplink transmit power obtained through scaling by the power scaling coefficient, but not based on the precoding codebook indicated by the TPMI that is delivered by the network device.

Optionally, if the number of antenna ports for each SRS resource in the SRS resource set is different, and the uplink transmission rank of the terminal device is less than the number of uplink transmission antenna ports, the terminal device may perform uplink transmission based on the uplink transmit power obtained through scaling by the power scaling coefficient and in an SRS resource transmission mode corresponding to the number of antenna ports of an SRS resource that is the same as the uplink transmission rank.

It can be learned that, in this embodiment, when the terminal device supports the second UE capability or the third UE capability, and supports the working mode 2, if the uplink transmission rank of the terminal device is less than the number of uplink transmission antenna ports, that is, when the number of antenna ports for the SRS resource included in the SRS resource set for codebook-based transmission is less than the maximum number of antenna ports supported by the SRS resource, the precoding codebook indicated by the TPMI is useless. In this case, the terminal device does not use the precoding codebook indicated by the TPMI that is delivered by the network device. Optionally, uplink transmission may be performed in the SRS resource transmission mode corresponding to the number of antenna ports of the SRS resource that is the same as the uplink transmission rank.

The following describes in detail how the network device configures a precoding codebook for the terminal device based on the uplink transmission parameter.

Embodiment 4

In this embodiment, the terminal device supports the second UE capability or the third UE capability. For example, none of the radio frequency branches of the terminal device supports full-power transmission or part of the radio frequency branches supports full-power transmission. The terminal device supports the working mode 1, for example, the number of antenna ports for each SRS resource in the SRS resource set configured by the network device is the same. Based on this, the precoding codebook may alternatively vary with the number of uplink transmission antenna ports and the uplink transmission rank. Specifically:

(1) When the number of uplink transmission antenna ports is 2 and the uplink transmission rank is 1, the precoding codebook may be determined to be:

a codebook corresponding to TPMI=2, namely, $$\frac{1}{\sqrt{2}}\begin{bmatrix}1\\1\end{bmatrix};$$

or
  a fully coherent codebook, a partially coherent codebook, and a non-coherent codebook.

(2) When the number of uplink transmission antenna ports is 4, the precoding codebook may be divided into the following cases, depending on different uplink transmission ranks:

a. When the uplink transmission rank is 1, the precoding codebook may be determined to be:

a codebook corresponding to TPMI=12, namely $$\frac{1}{2}\begin{bmatrix}1\\1\\1\\-1\end{bmatrix} \text{ or } \frac{1}{2}\begin{bmatrix}1\\1\\1\\1\end{bmatrix};$$

or
  a codebook corresponding to TPMI=8, namely, $$\frac{1}{2}\begin{bmatrix}0\\1\\0\\1\end{bmatrix};$$

or
  a codebook corresponding to TPMI=4, namely, $$\frac{1}{2}\begin{bmatrix}1\\0\\1\\0\end{bmatrix};$$

or
  a fully coherent codebook, a partially coherent codebook, and a non-coherent codebook.

Preferably, a codebook corresponding to TPMI=12 is used, namely, $$\frac{1}{2}\begin{bmatrix}1\\1\\1\\-1\end{bmatrix} \text{ or }$$

$$\frac{1}{2}\begin{bmatrix}1\\1\\1\\1\end{bmatrix}.$$

b. When the uplink transmission rank is 2, the precoding codebook may be determined to be:

a codebook corresponding to TPMI=6, namely, $$\frac{1}{2}\begin{bmatrix}1 & 0\\0 & 1\\1 & 0\\0 & -j\end{bmatrix};$$

or
  a fully coherent codebook, a partially coherent codebook, and a non-coherent codebook.

c. When the uplink transmission rank is 3, the precoding codebook may be determined to be:

a codebook corresponding to TPMI=1, namely, $$\frac{1}{2}\begin{bmatrix}1 & 0 & 0\\0 & 1 & 0\\1 & 0 & 0\\0 & 0 & 1\end{bmatrix};$$

or a fully coherent codebook, a partially coherent codebook, and a non-coherent codebook.

Embodiment 5

In this embodiment, the terminal device supports the second UE capability or the third UE capability. For example, none of the radio frequency branches of the terminal device supports full-power transmission or part of the radio frequency branches supports full-power transmission. The terminal device supports the working mode 2, for example, the number of antenna ports for each SRS resource in the SRS resource set configured by the network device is different. Based on this, the precoding codebook may alternatively vary with the number of uplink transmission antenna ports, the uplink transmission rank, and the number of antenna ports for each SRS resource. Specifically:

(1) The number of uplink transmission antenna ports is 2, and the SRS resource configured by the network device includes two SRS resources, with one SRS resource including one antenna port and the other SRS resource including two antenna ports. In this case, if the network device configures an antenna port for only one SRS resource, because the uplink transmission rank of the terminal device is less than the number of uplink transmission antenna ports, that is, the number of antenna ports for each SRS resource in the SRS resource set is less than the maximum number of antenna ports supported by the SRS resource, the precoding codebook indicated by the TPMI is useless. In this case, the terminal device does not use the precoding codebook indicated by the TPMI that is delivered by the network device. Optionally, uplink transmission may be performed in the SRS resource transmission mode corresponding to the number of antenna ports of the SRS resource that is the same as the uplink transmission rank.

(2) The number of uplink transmission antenna ports is 4. The precoding codebook alternatively varies with the number of SRS resources included in the SRS resource set and the number of antenna ports included in each SRS resource. Specifically:

a. The SRS resource set includes two SRS resources, with one SRS resource including one antenna port and the other SRS resource including four antenna ports, then:

when the uplink transmission rank is 1, because the uplink transmission rank is less than the uplink transmission antenna port number, that is, the number of antenna ports for each SRS resource in the SRS resource set is less than the maximum number of antenna ports supported by the SRS resource, the precoding codebook indicated by the TPMI is useless; in this case, the terminal device does not use the precoding codebook indicated by the TPMI that is delivered by the network device; optionally, uplink transmission may be performed in the SRS resource transmission mode corresponding to the number of antenna ports of the SRS resource that is the same as the uplink transmission rank;

when the uplink transmission rank is 2, the precoding codebook may be determined to be: a codebook corresponding to TPMI=6, that is:

$$\frac{1}{2}\begin{bmatrix} 1 & 0 \\ 0 & 1 \\ 1 & 0 \\ 0 & -j \end{bmatrix};$$

or a fully coherent codebook, a partially coherent codebook, and a non-coherent codebook; or when the uplink transmission rank is 3, the precoding codebook may be determined to be: a codebook corresponding to TPMI=1, that is:

$$\frac{1}{2}\begin{bmatrix} 1 & 0 & 0 \\ 0 & 1 & 0 \\ 1 & 0 & 0 \\ 0 & 0 & 1 \end{bmatrix};$$

or a fully coherent codebook, a partially coherent codebook, and a non-coherent codebook.

b. The SRS resource set includes three SRS resources, with one SRS resource including one antenna port, a second SRS resource including two antenna ports, and a third SRS resource including four antenna ports, then:

when the uplink transmission rank is 1 or 2, because the uplink transmission rank is less than the uplink transmission antenna port number, that is, the number of antenna ports for each SRS resource in the SRS resource set is less than the maximum number of antenna ports supported by the SRS resource, the precoding codebook indicated by the TPMI is useless; in this case, the terminal device does not use the precoding codebook indicated by the TPMI that is delivered by the network device; optionally, uplink transmission may be performed in the SRS resource transmission mode corresponding to the number of antenna ports of the SRS resource that is the same as the uplink transmission rank; or when the uplink transmission rank is 3, the precoding codebook may be determined to be: a codebook corresponding to TPMI=1, that is:

$$\frac{1}{2}\begin{bmatrix} 1 & 0 & 0 \\ 0 & 1 & 0 \\ 1 & 0 & 0 \\ 0 & 0 & 1 \end{bmatrix};$$

or a fully coherent codebook, a partially coherent codebook, and a non-coherent codebook.

The specific embodiments of this specification are described above. Other embodiments fall within the scope of the claims. In some cases, actions or steps described in the claims may be performed in an order different from that in the embodiments, and may still implement desired results. In addition, the processes described in the accompanying drawings are not necessarily performed in an illustrated particular order or sequentially to implement the desired results. In some embodiments, multi-task processing and parallel processing are also acceptable or may be advantageous.

Figure 3:
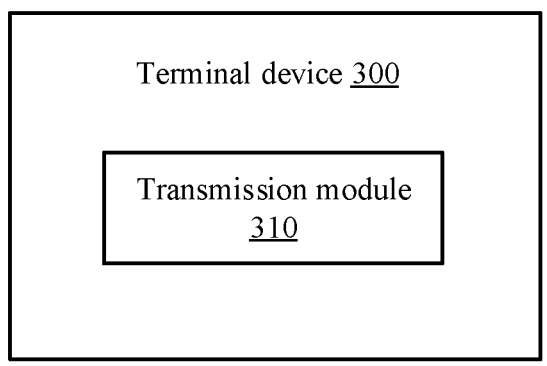
FIG. 3 is a schematic structural diagram of a terminal device according to an embodiment of this disclosure.

FIG. 3 is a schematic structural diagram of a terminal device according to an embodiment of this disclosure. Referring to FIG. 3, the terminal device 300 may include:

a transmission module 310, configured to: perform uplink transmission based on an uplink transmit power obtained through scaling by a power scaling coefficient, where the power scaling coefficient is determined based on a power control factor.

The power control factor includes at least one of the following: an uplink full-power transmission capability of the terminal device, a supported transmission precoding matrix indicator TPMI reported by the terminal device, a TPMI delivered by a network device, a working mode reported by the terminal device, or the number of antenna ports for each SRS resource in a sounding reference signal SRS resource set that is configured by the network device based on the working mode.

In an embodiment, the transmission module 310 is further configured to:
if the power control factor satisfies the following condition, determine the power scaling coefficient to be 1:
all radio frequency branches of the terminal device support full-power transmission; or
part of radio frequency branches of the terminal device supports full-power transmission, the number of antenna ports for each SRS resource in the SRS resource set is different, and the TPMI delivered by the network device falls within the TPMI reported by the terminal device.

The full-power transmission is transmission based on a maximum transmit power of the terminal device.

In an embodiment, the transmission module 310 is further configured to:
if the power control factor satisfies the following condition, determine the power scaling coefficient to be a ratio of the number of non-zero antenna ports to the maximum number of antenna ports that is supported by a single SRS resource and reported by the terminal device:
none of radio frequency branches of the terminal device supports full-power transmission, and the number of antenna ports for each SRS resource in the SRS resource set is the same; or
part of radio frequency branches of the terminal device supports full-power transmission, and the number of antenna ports for each SRS resource in the SRS resource set is the same; or
part of radio frequency branches of the terminal device supports full-power transmission, the number of antenna ports for each SRS resource in the SRS resource set is different, and the TPMI delivered by the network device does not fall within the TPMI reported by the terminal device; where
the non-zero antenna port means that row values of a precoding codebook corresponding to the antenna port are all non-zero.

In an embodiment, the transmission module 310 is further configured to:
if the power control factor satisfies the following condition, determine the power scaling coefficient to be a ratio of the number of non-zero antenna ports to the maximum number of antenna ports supported by the SRS resource that is configured by the network device:
none of radio frequency branches of the terminal device supports full-power sending, and the number of antenna ports for each SRS resource in the SRS resource set is different; or
part of radio frequency branches of the terminal device supports full-power sending, the number of antenna ports for each SRS resource in the SRS resource set is different, and no full-power transmission TPMI is reported by the terminal device.

In an embodiment, the transmission module 310 is further configured to:
report the uplink full-power transmission capability; or
report the uplink full-power transmission capability and receive an uplink full-power transmission indication delivered by the network device, where the uplink full-power transmission indication is used to indicate that the terminal device is to use an uplink full-power transmission mode for uplink transmission.

In an embodiment, the transmission module 310 is further configured to:
if the uplink full-power transmission capability of the terminal device is that none of radio frequency branches supports full-power transmission or part of radio frequency branches supports full-power transmission, and an uplink transmission rank of the terminal device is equal to the number of uplink transmission antenna ports of the terminal device, perform uplink transmission based on the uplink transmit power according to a precoding codebook delivered by the network device; where
the precoding codebook is determined based on the number of uplink transmission antenna ports of the terminal device, the uplink transmission rank, and the number of antenna ports for each SRS resource in the SRS resource set.

In an embodiment, the transmission module 310 is further configured to:
if the number of antenna ports for each SRS resource in the SRS resource set configured by the network device is different, and an uplink transmission rank is less than the number of uplink transmission antenna ports, perform uplink transmission based on the uplink transmit power in an SRS resource transmission mode corresponding to the number of antenna ports of an SRS resource that is the same as the uplink transmission rank.

The terminal device provided in this embodiment of this disclosure is capable of implementing the processes that are implemented by the terminal device in the foregoing method embodiments. To avoid repetition, details are not described herein again.

According to this embodiment of this disclosure, the terminal device can perform uplink transmission based on the uplink transmit power obtained through scaling by the power scaling coefficient, and comprehensively consider a plurality of power control factors (including at least one of the uplink full-power transmission capability of the terminal device, the supported transmission precoding matrix indicator TPMI reported by the terminal device, the TPMI delivered by the network device, the working mode reported by the terminal device, or the number of antenna ports for each SRS resource in the sounding reference signal SRS resource set that is configured by the network device based on the working mode) to scale the uplink transmit power. In this way, an uplink transmit power is improved, an uplink coverage is enhanced, and uplink full-power transmission is implemented for the terminal device.

Figure 4:
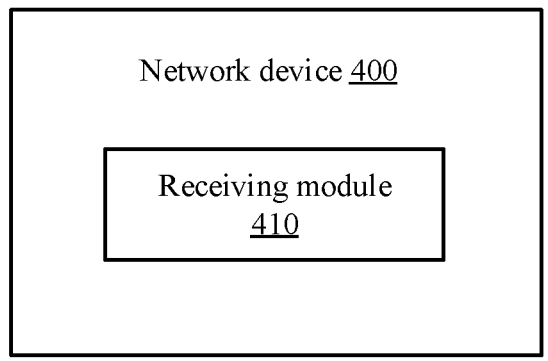
FIG. 4 is a schematic structural diagram of a network device according to an embodiment of this disclosure.

FIG. 4 is a schematic structural diagram of a network device according to an embodiment of this disclosure. Referring to FIG. 4, the network device 400 may include:
a receiving module 410, configured to receive uplink data sent by a terminal device, where the uplink data is transmitted on uplink by the terminal device based on an uplink transmit power obtained through scaling by a power scaling coefficient, and the power scaling coefficient is determined based on a power control factor.

The power control factor includes at least one of the following: an uplink full-power transmission capability of the terminal device, a supported transmission precoding matrix indicator TPMI reported by the terminal device, a TPMI delivered by a network device, a working mode reported by the terminal device, or the number of antenna ports for each SRS resource in a sounding reference signal SRS resource set that is configured by the network device based on the working mode.

In an embodiment, the network device 400 further includes:

a first delivery module, configured to: before the uplink data sent by the terminal device is received, if none of radio frequency branches of the terminal device supports full-power transmission or part of radio frequency branches supports full-power transmission, deliver a TPMI to the terminal device, where the delivered TPMI is used to indicate that the terminal device is to perform uplink transmission based on a precoding codebook that is determined based on an uplink transmission parameter; where the uplink transmission parameter includes the number of uplink transmission antenna ports of the terminal device, an uplink transmission rank, and the number of antenna ports for each SRS resource in the SRS resource set configured by the network device; and the full-power transmission indicates transmission performed based on a maximum transmit power of the terminal device.

In an embodiment, the first delivery module 410 is further configured to:

if the number of antenna ports for each SRS resource in the SRS resource set is the same, the number of uplink transmission antenna ports is 2, and the uplink transmission rank is 1, determine the precoding codebook to be:

$$\frac{1}{\sqrt{2}}\begin{bmatrix}1\\1\end{bmatrix};$$

or a fully coherent codebook, a partially coherent codebook, and a non-coherent codebook.

In an embodiment, the first delivery module 410 is further configured to:

if the number of antenna ports for each SRS resource in the SRS resource set is the same, the number of uplink transmission antenna ports is 2, and the uplink transmission rank is 1, determine the precoding codebook to be:

$$\frac{1}{\sqrt{2}}\begin{bmatrix}1\\1\end{bmatrix};$$

or a fully coherent codebook, a partially coherent codebook, and a non-coherent codebook.

In an embodiment, the first delivery module 410 is further configured to:

if the number of antenna ports for each SRS resource in the SRS resource set is the same, the number of uplink transmission antenna ports is 4, and the uplink transmission rank is 1, determine the precoding codebook to be:

$$\frac{1}{2}\begin{bmatrix}1\\1\\1\\-1\end{bmatrix} \text{ or } \frac{1}{2}\begin{bmatrix}1\\1\\1\\1\end{bmatrix}; \text{ or}$$

$$\frac{1}{2}\begin{bmatrix}0\\1\\0\\1\end{bmatrix}; \text{ or}$$

$$\frac{1}{2}\begin{bmatrix}1\\0\\1\\0\end{bmatrix}; \text{ or}$$

or a fully coherent codebook, a partially coherent codebook, and a non-coherent codebook.

In an embodiment, the first delivery module 410 is further configured to:

if the number of antenna ports for each SRS resource in the SRS resource set is the same, the number of uplink transmission antenna ports is 4, and the uplink transmission rank is 2, determine the precoding codebook to be:

$$\frac{1}{2}\begin{bmatrix}1 & 0\\0 & 1\\1 & 0\\0 & -j\end{bmatrix};$$

or a fully coherent codebook, a partially coherent codebook, and a non-coherent codebook.

In an embodiment, the first delivery module 410 is further configured to:

if the number of antenna ports for each SRS resource in the SRS resource set is the same, the number of uplink transmission antenna ports is 4, and the uplink transmission rank is 3, determine the precoding codebook to be:

$$\frac{1}{2}\begin{bmatrix}1 & 0 & 0\\0 & 1 & 0\\1 & 0 & 0\\0 & 0 & 1\end{bmatrix};$$

or a fully coherent codebook, a partially coherent codebook, and a non-coherent codebook.

In an embodiment, the first delivery module 410 is further configured to:

if the number of antenna ports for each SRS resource in the SRS resource set is different, the number of uplink transmission antenna ports is 4, and the SRS resource set includes two SRS resources, with one SRS resource including one antenna port and the other SRS resource including four antenna ports, then:
if the uplink transmission rank is 2, determine the precoding codebook to be:

$$\frac{1}{2}\begin{bmatrix} 1 & 0 \\ 0 & 1 \\ 1 & 0 \\ 0 & -j \end{bmatrix};$$

or a fully coherent codebook, a partially coherent codebook, and a non-coherent codebook; or
if the uplink transmission rank is 3, determine the precoding codebook to be:

$$\frac{1}{2}\begin{bmatrix} 1 & 0 & 0 \\ 0 & 1 & 0 \\ 1 & 0 & 0 \\ 0 & 0 & 1 \end{bmatrix};$$

or a fully coherent codebook, a partially coherent codebook, and a non-coherent codebook.

In an embodiment, the first delivery module 410 is further configured to:
if the number of antenna ports for each SRS resource in the SRS resource set is different, the number of uplink transmission antenna ports is 4, the uplink transmission rank is 3, and the SRS resource set includes three SRS resources, with one SRS resource including one antenna port, a second SRS resource including two antenna ports, and a third SRS resource including four antenna ports, determine the precoding codebook to be:

$$\frac{1}{2}\begin{bmatrix} 1 & 0 & 0 \\ 0 & 1 & 0 \\ 1 & 0 & 0 \\ 0 & 0 & 1 \end{bmatrix};$$

or
a fully coherent codebook, a partially coherent codebook, and a non-coherent codebook.

In an embodiment, the network device 400 further includes:
a second delivery module, configured to: when the uplink full-power transmission capability reported by the terminal device is received, deliver an uplink full-power transmission indication to the terminal device, where the uplink full-power transmission indication is used to indicate that the terminal device is to use an uplink full-power transmission mode for uplink transmission.

In an embodiment, the second delivery module is further configured to:
deliver the uplink full-power transmission indication through radio resource control RRC, medium access control MAC, or downlink control information DCI; or
deliver a full-power transmission TPMI; or
configure, for the terminal device, an SRS resource corresponding to the precoding codebook, where the number of antenna ports of the configured SRS resource is the same as the number of non-zero antenna ports indicated by the precoding codebook.

The non-zero antenna port means that row values of a precoding codebook corresponding to the antenna port are all non-zero.

The network device provided in this embodiment of this disclosure is capable of implementing the processes implemented by the network device in the foregoing method embodiment. To avoid repetition, details are not described herein again.

According to this embodiment of this disclosure, the network device can receive the uplink data sent by the terminal device, where the uplink data is transmitted on uplink by the terminal device based on the uplink transmit power obtained through scaling by the power scaling coefficient, and the power scaling coefficient is determined based on the power control factor (including at least one of the uplink full-power transmission capability of the terminal device, the supported transmission precoding matrix indicator TPMI reported by the terminal device, the TPMI delivered by the network device, the working mode reported by the terminal device, or the number of antenna ports for each SRS resource in the sounding reference signal SRS resource set that is configured by the network device based on the working mode). In this way, an uplink transmit power is improved, an uplink coverage is enhanced, and uplink full-power transmission is implemented for the terminal device.

Figure 5:
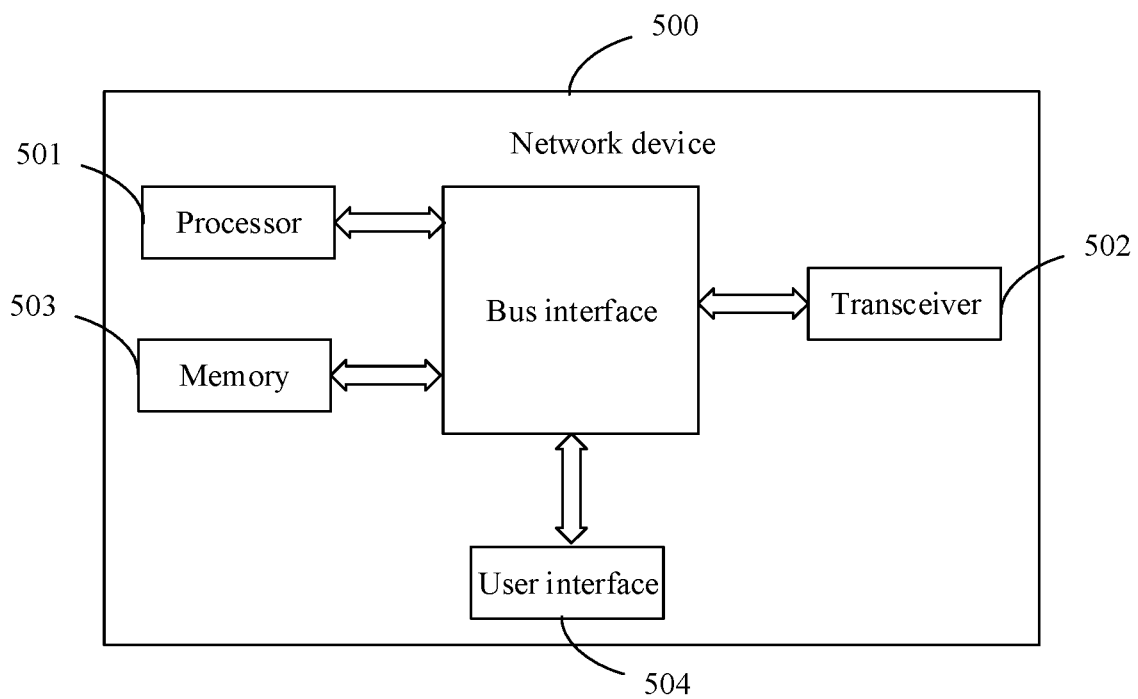
FIG. 5 is a schematic structural diagram of a network device according to another embodiment of this disclosure.

Referring to FIG. 5, FIG. 5 is a structural diagram of a network device to which an embodiment of this disclosure is applied. Details of the uplink full-power transmission method executed by the network device in the foregoing embodiments can be implemented, with the same effects achieved. As shown in FIG. 5, the network device 500 includes a processor 501, a transceiver 502, a memory 503, a user interface 504, and a bus interface.

In this embodiment of this disclosure, the network device 500 further includes a computer program stored in the memory 503 and capable of running on the processor 501. When the computer program is executed by the processor 501, the following step is implemented:
receiving uplink data sent by a terminal device, where the uplink data is transmitted on uplink by the terminal device based on an uplink transmit power obtained through scaling by a power scaling coefficient, and the power scaling coefficient is determined based on a power control factor; where
the power control factor includes at least one of the following: an uplink full-power transmission capability of the terminal device, a supported transmission precoding matrix indicator TPMI reported by the terminal device, a TPMI delivered by the network device, a working mode reported by the terminal device, or the number of antenna ports for each SRS resource in a sounding reference signal SRS resource set that is configured by the network device based on the working mode.

In FIG. 5, a bus architecture may include any quantity of interconnected buses and bridges, specifically for interconnecting various circuits of one or more processors represented by the processor 501 and a memory represented by the memory 503. The bus architecture may further interconnect various other circuits such as a peripheral device, a voltage regulator, and a power management circuit. These are all well known in the art, and therefore are not further described in this specification. The bus interface provides an interface. The transceiver 502 may be a plurality of components, that is, the transceiver 502 includes a transmitter and a receiver, and provides a unit for communicating with various other apparatuses on a transmission medium. For different user equipments, the user interface 504 may also be an interface that can be externally or internally connected to a required device. The connected device includes but is not limited to a keypad, a display, a speaker, a microphone, a joystick, and the like.

The processor 501 is responsible for bus architecture management and general processing. The memory 503 may store data used when the processor 501 performs an operation.

Optionally, when the computer program is executed by the processor 501, the following step may be further implemented:

before the uplink data sent by the terminal device is received, if none of radio frequency branches of the terminal device supports full-power transmission or part of radio frequency branches supports full-power transmission, delivering a TPMI to the terminal device, where the delivered TPMI is used to indicate that the terminal device is to perform uplink transmission based on a precoding codebook that is determined based on an uplink transmission parameter; where the uplink transmission parameter includes the number of uplink transmission antenna ports of the terminal device, an uplink transmission rank, and the number of antenna ports for each SRS resource in the SRS resource set configured by the network device; and the full-power transmission indicates transmission performed based on a maximum transmit power of the terminal device.

Optionally, when the computer program is executed by the processor 501, the following step may be further implemented:

if the number of antenna ports for each SRS resource in the SRS resource set is the same, the number of uplink transmission antenna ports is 2, and the uplink transmission rank is 1, determining the precoding codebook to be:

$$\frac{1}{\sqrt{2}}\begin{bmatrix}1\\1\end{bmatrix};$$

or a fully coherent codebook, a partially coherent codebook, and a non-coherent codebook.

Optionally, when the computer program is executed by the processor 501, the following step may be further implemented:

if the number of antenna ports for each SRS resource in the SRS resource set is the same, the number of uplink transmission antenna ports is 4, and the uplink transmission rank is 1, determining the precoding codebook to be:

$$\frac{1}{2}\begin{bmatrix}1\\1\\1\\-1\end{bmatrix} \text{ or } \frac{1}{2}\begin{bmatrix}1\\1\\1\\1\end{bmatrix}; \text{ or}$$

$$\frac{1}{2}\begin{bmatrix}0\\1\\0\\1\end{bmatrix}; \text{ or}$$

$$\frac{1}{2}\begin{bmatrix}1\\0\\1\\0\end{bmatrix};$$

or a fully coherent codebook, a partially coherent codebook, and a non-coherent codebook.

Optionally, when the computer program is executed by the processor 501, the following step may be further implemented:

if the number of antenna ports for each SRS resource in the SRS resource set is the same, the number of uplink transmission antenna ports is 4, and the uplink transmission rank is 2, determining the precoding codebook to be:

$$\frac{1}{2}\begin{bmatrix}1 & 0\\0 & 1\\1 & 0\\0 & -j\end{bmatrix};$$

or a fully coherent codebook, a partially coherent codebook, and a non-coherent codebook.

Optionally, when the computer program is executed by the processor 501, the following step may be further implemented:

if the number of antenna ports for each SRS resource in the SRS resource set is the same, the number of uplink transmission antenna ports is 4, and the uplink transmission rank is 3, determining the precoding codebook to be:

$$\frac{1}{2}\begin{bmatrix}1 & 0 & 0\\0 & 1 & 0\\1 & 0 & 0\\0 & 0 & 1\end{bmatrix};$$

or a fully coherent codebook, a partially coherent codebook, and a non-coherent codebook.

Optionally, when the computer program is executed by the processor 501, the following step may be further implemented:

if the number of antenna ports for each SRS resource in the SRS resource set is different, the number of uplink transmission antenna ports is 4, and the SRS resource set includes two SRS resources, with one SRS resource including one antenna port and the other SRS resource including four antenna ports, then:

if the uplink transmission rank is 2, determining the precoding codebook to be:

$$\frac{1}{2}\begin{bmatrix}1 & 0\\0 & 1\\1 & 0\\0 & -j\end{bmatrix};$$

or a fully coherent codebook, a partially coherent codebook, and a non-coherent codebook; or if the uplink transmission rank is 3, determining the precoding codebook to be:

$$\frac{1}{2}\begin{bmatrix} 1 & 0 & 0 \\ 0 & 1 & 0 \\ 1 & 0 & 0 \\ 0 & 0 & 1 \end{bmatrix};$$

or a fully coherent codebook, a partially coherent codebook, and a non-coherent codebook.

Optionally, when the computer program is executed by the processor 501, the following step may be further implemented:

if the number of antenna ports for each SRS resource in the SRS resource set is different, the number of uplink transmission antenna ports is 4, the uplink transmission rank is 3, and the SRS resource set includes three SRS resources, with one SRS resource including one antenna port, a second SRS resource including two antenna ports, and a third SRS resource including four antenna ports, determining the precoding codebook to be:

$$\frac{1}{2}\begin{bmatrix} 1 & 0 & 0 \\ 0 & 1 & 0 \\ 1 & 0 & 0 \\ 0 & 0 & 1 \end{bmatrix};$$

or a fully coherent codebook, a partially coherent codebook, and a non-coherent codebook.

Optionally, when the computer program is executed by the processor 501, the following step may be further implemented:

when the uplink full-power transmission capability reported by the terminal device is received, delivering an uplink full-power transmission indication to the terminal device, where the uplink full-power transmission indication is used to indicate that the terminal device is to use an uplink full-power transmission mode for uplink transmission.

Optionally, when the computer program is executed by the processor 501, the following step may be further implemented:

delivering the uplink full-power transmission indication through radio resource control RRC, medium access control MAC, or downlink control information DCI; or delivering a full-power transmission TPMI; or configuring, for the terminal device, an SRS resource corresponding to the precoding codebook, where the number of antenna ports of the configured SRS resource is the same as the number of non-zero antenna ports indicated by the precoding codebook; where the non-zero antenna port means that row values of a precoding codebook corresponding to the antenna port are all non-zero.

According to the embodiments of this disclosure, the network device can receive the uplink data sent by the terminal device, where the uplink data is transmitted on uplink by the terminal device based on the uplink transmit power obtained through scaling by the power scaling coefficient, and the power scaling coefficient is determined based on the power control factor (including at least one of the uplink full-power transmission capability of the terminal device, the supported transmission precoding matrix indicator TPMI reported by the terminal device, the TPMI delivered by the network device, the working mode reported by the terminal device, or the number of antenna ports for each SRS resource in the sounding reference signal SRS resource set that is configured by the network device based on the working mode). In this way, an uplink transmit power is improved, an uplink coverage is enhanced, and uplink full-power transmission is implemented for the terminal device.

FIG. 6 is a block diagram of a terminal device according to another embodiment of this disclosure. The terminal device 600 shown in FIG. 6 includes at least one processor 601, a memory 602, at least one network interface 604, and a user interface 603. The components of the terminal device 600 are coupled together by using a bus system 605. It can be understood that the bus system 605 is configured to implement connection communication between these components. The bus system 605 may include not only a data bus but also a power supply bus, a control bus, and a status signal bus. However, for clarity of description, various types of buses in FIG. 6 are marked as the bus system 605.

The user interface 603 may include a display, a keyboard, a click device (for example, a mouse or a trackball), a touch board, or a touchscreen.

It can be understood that the memory 602 in this embodiment of this disclosure may be a volatile memory or a non-volatile memory, or may include both a volatile memory and a non-volatile memory. The non-volatile memory may be a read-only memory (ROM), a programmable read only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double DataRate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 602 in the system and method described in the embodiments of this disclosure is intended to include but is not limited to these and any other suitable types of memories.

In some implementations, the memory 602 stores the following elements: an executable module or a data structure, or a subset thereof, or an extended set thereof: an operating system 6021 and an application program 6022.

An operating system 6021 includes various system programs, such as a framework layer, a kernel library layer, and a driver layer, and is configured to implement various basic services and process hardware-based tasks. The application program 6022 includes various application programs, such as a media player, and a browser, and is configured to implement various application services. A program that implements the methods of the embodiments of this disclosure may be included in the application program 6022.

In this embodiment of this disclosure, the terminal device 600 further includes a computer program stored in the memory 609 and capable of running on the processor 601. When being executed by the processor 601, the computer program implements the following steps:

performing uplink transmission based on an uplink transmit power obtained through scaling by a power scaling coefficient, where the power scaling coefficient is determined based on a power control factor; where the power control factor includes at least one of the following: an uplink full-power transmission capability of the terminal device, a supported transmission precoding matrix indicator TPMI reported by the terminal device, a TPMI delivered by the network device, a working mode reported by the terminal device, or the number of antenna ports for each SRS resource in a sounding reference signal SRS resource set that is configured by the network device based on the working mode.

The methods disclosed in the embodiments of this disclosure are applicable to the processor 601, or implemented by the processor 601. The processor 601 may be an integrated circuit chip with a signal processing capability. In an implementation process, the steps in the foregoing method may be implemented by using a hardware integrated logic circuit in the processor 601, or by using instructions in a form of software. The processor 601 may be a general-purpose processor, a digital signal processor (DSP), an application-specific integrated circuit (ASIC), a field programmable gate array (FPGA) or another programmable logical device, a discrete gate or transistor logical device, or a discrete hardware component. The processor 601 may implement or execute the methods, steps, and logical block diagrams disclosed in the embodiments of this disclosure. The general-purpose processor may be a microprocessor or any regular processor. The steps of the methods disclosed with reference to the embodiments of this disclosure may be directly implemented by a hardware decoding processor, or may be implemented by a combination of hardware and software modules in a decoding processor. The software module may be located in a computer-readable storage medium that is mature in the art, such as a random access memory, a flash memory, a read-only memory, a programmable read-only memory, or an electrically erasable programmable memory, or a register. The computer-readable storage medium is located in the memory 602, and the processor 601 reads information in the memory 602 and implements, in combination with its hardware, the steps of the foregoing methods. Specifically, a computer program is stored in the computer-readable storage medium, and when the computer program is executed by the processor 601, the steps of the embodiments of the foregoing method for uplink full-power transmission are implemented.

It can be understood that the embodiments described in this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

Optionally, when the computer program is executed by the processor 601, the following step may be further implemented:

if the power control factor satisfies the following condition, determining the power scaling coefficient to be 1:

all radio frequency branches of the terminal device support full-power transmission; or part of radio frequency branches of the terminal device supports full-power transmission, the number of antenna ports for each SRS resource in the SRS resource set is different, and the TPMI delivered by the network device falls within the TPMI reported by the terminal device; where the full-power transmission is transmission based on a maximum transmit power of the terminal device.

Optionally, when the computer program is executed by the processor 601, the following step may be further implemented:

if the power control factor satisfies the following condition, determining the power scaling coefficient to be a ratio of the number of non-zero antenna ports to the maximum number of antenna ports that is supported by a single SRS resource and reported by the terminal device:

none of radio frequency branches of the terminal device supports full-power transmission, and the number of antenna ports for each SRS resource in the SRS resource set is the same; or part of radio frequency branches of the terminal device supports full-power transmission, and the number of antenna ports for each SRS resource in the SRS resource set is the same; or part of radio frequency branches of the terminal device supports full-power transmission, the number of antenna ports for each SRS resource in the SRS resource set is different, and the TPMI delivered by the network device does not fall within a full-power transmission TPMI reported by the terminal device; where the non-zero antenna port means that row values of a precoding codebook corresponding to the antenna port are all non-zero.

Optionally, when the computer program is executed by the processor 601, the following step may be further implemented:

if the power control factor satisfies the following condition, determining the power scaling coefficient to be a ratio of the number of non-zero antenna ports to the maximum number of antenna ports supported by the SRS resource that is configured by the network device:

none of radio frequency branches of the terminal device supports full-power sending, and the number of antenna ports for each SRS resource in the SRS resource set is different; or part of radio frequency branches of the terminal device supports full-power sending, the number of antenna ports for each SRS resource in the SRS resource set is different, and no full-power transmission TPMI is reported by the terminal device.

Optionally, when the computer program is executed by the processor 601, the following step may be further implemented:

reporting the uplink full-power transmission capability; or reporting the uplink full-power transmission capability, and receiving an uplink full-power transmission indication delivered by the network device, where the uplink full-power transmission indication is used to indicate that the terminal device is to use an uplink full-power transmission mode for uplink transmission.

Optionally, when the computer program is executed by the processor 601, the following step may be further implemented:

if the uplink full-power transmission capability of the terminal device is that none of radio frequency branches supports full-power transmission or part of radio frequency branches supports full-power transmission, and an uplink transmission rank of the terminal device is equal to the number of uplink transmission antenna ports of the terminal device, performing uplink transmission based on the uplink transmit power according to a precoding codebook delivered by the network device; where the precoding codebook is determined based on the number of uplink transmission antenna ports of the terminal device, the uplink transmission rank, and the number of antenna ports for each SRS resource in the SRS resource set.

Optionally, when the computer program is executed by the processor 601, the following step may be further implemented:

if the number of antenna ports for each SRS resource in the SRS resource set configured by the network device is different, and an uplink transmission rank is less than the number of uplink transmission antenna ports, performing uplink transmission based on the uplink transmit power in an SRS resource transmission mode corresponding to the number of antenna ports of an SRS resource that is the same as the uplink transmission rank.

The terminal device 600 is capable of implementing the processes implemented by the terminal device in the foregoing embodiments. To avoid repetition, details are not described herein again.

According to this embodiment of this disclosure, the terminal device can perform uplink transmission based on the uplink transmit power obtained through scaling by the power scaling coefficient, and comprehensively consider a plurality of power control factors (including at least one of the uplink full-power transmission capability of the terminal device, the supported transmission precoding matrix indicator TPMI reported by the terminal device, the TPMI delivered by the network device, the working mode reported by the terminal device, or the number of antenna ports for each SRS resource in the sounding reference signal SRS resource set that is configured by the network device based on the working mode) to scale the uplink transmit power. In this way, an uplink transmit power is improved, an uplink coverage is enhanced, and uplink full-power transmission is implemented for the terminal device.

Optionally, an embodiment of this disclosure further provides a terminal device, including a processor, a memory, and a computer program stored in the memory and capable of running on the processor. When the computer program is executed by the processor, the processes of the foregoing embodiment of the uplink full-power transmission method are implemented, with the same technical effects achieved. To avoid repetition, details are not described herein again.

Optionally, an embodiment of this disclosure further provides a network device, including a processor, a memory, and a computer program stored in the memory and capable of running on the processor. When the computer program is executed by the processor, the processes of the foregoing embodiment of the uplink full-power transmission method are implemented, with the same technical effects achieved. To avoid repetition, details are not described herein again.

An embodiment of this disclosure further provides a computer-readable storage medium, where a computer program is stored in the computer readable storage medium. When the computer program is executed by a processor, the processes of the foregoing embodiment of the uplink full-power transmission method are implemented, with the same technical effects achieved. To avoid repetition, details are not described herein again. The computer-readable storage medium is, for example, a read-only memory (ROM), a random access memory (RAM), a magnetic disk, or an optical disc.

FIG. 7 is a flowchart of an uplink full-power transmission method according to an embodiment of this disclosure. The method in FIG. 7 is applied to a network device, and may include:

S701: If none of radio frequency branches of a terminal device supports full-power transmission or part of radio frequency branches supports full-power transmission, deliver a TPMI to the terminal device, where the delivered TPMI is used to indicate that the terminal device is to perform uplink transmission based on a precoding codebook that is determined based on an uplink transmission parameter.

The uplink transmission parameter includes the number of uplink transmission antenna ports of the terminal device, an uplink transmission rank, and the number of antenna ports for each SRS resource in the SRS resource set configured by the network device; and the full-power transmission indicates transmission performed based on a maximum transmit power of the terminal device.

It should be noted that the precoding codebook may alternatively vary with the number of uplink transmission antenna ports and the uplink transmission rank. A manner of determining a precoding codebook is the same as that described in the foregoing embodiment, and is not repeated herein.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. An uplink full-power transmission method, applied to a terminal device and comprising:
performing uplink transmission based on an uplink transmit power obtained through scaling by a power scaling coefficient, wherein the power scaling coefficient is determined based on a power control factor; wherein
the power control factor comprises at least one of the following: an uplink full-power transmission capability of the terminal device, a supported transmission precoding matrix indicator (TPMI) reported by the terminal device, a TPMI delivered by a network device, a working mode reported by the terminal device, or the number of antenna ports for each SRS resource in a sounding reference signal (SRS) resource set that is configured by the network device based on the working mode;
wherein the power scaling coefficient is determined in the following manner:
if the power control factor satisfies the following condition, determining the power scaling coefficient to be 1:
part of radio frequency branches of the terminal device supports full-power transmission, the number of antenna ports for each SRS resource in the SRS resource set is different, and the TPMI delivered by the network device falls within the TPMI reported by the terminal device; wherein
the full-power transmission is transmission based on a maximum transmit power of the terminal device.

2. The method according to claim 1, wherein the uplink full-power transmission capability is determined in any one of the following manners:
reporting the uplink full-power transmission capability; or
reporting the uplink full-power transmission capability, and receiving an uplink full-power transmission indication delivered by the network device, wherein the uplink full-power transmission indication is used to indicate that the terminal device is to use an uplink full-power transmission mode for uplink transmission.

3. The method according to claim 1, the performing uplink transmission based on an uplink transmit power obtained through scaling by a power scaling coefficient comprises:
if the uplink full-power transmission capability of the terminal device is that none of radio frequency branches supports full-power transmission or part of radio frequency branches supports full-power transmission, and an uplink transmission rank of the terminal device is equal to the number of uplink transmission antenna ports of the terminal device, performing uplink transmission based on the uplink transmit power according to a precoding codebook delivered by the network device; wherein
the precoding codebook is determined based on the number of uplink transmission antenna ports of the terminal device, the uplink transmission rank, and the number of antenna ports for each SRS resource in the SRS resource set.

4. The method according to claim 1, the performing uplink transmission based on an uplink transmit power obtained through scaling by a power scaling coefficient comprises:
if the number of antenna ports for each SRS resource in the SRS resource set configured by the network device is different, and an uplink transmission rank of the terminal device is less than the number of uplink transmission antenna ports of the terminal device, performing uplink transmission based on the uplink transmit power in an SRS resource transmission mode corresponding to the number of antenna ports of an SRS resource that is the same as the uplink transmission rank.

5. A terminal device, comprising:
a memory, storing a computer program instruction; and
a processor, wherein the computer program instruction is executed by the processor to implement:
performing uplink transmission based on an uplink transmit power obtained through scaling by a power scaling coefficient, wherein the power scaling coefficient is determined based on a power control factor; wherein
the power control factor comprises at least one of the following: an uplink full-power transmission capability of the terminal device, a supported transmission precoding matrix indicator (TPMI) reported by the terminal device, a TPMI delivered by a network device, a working mode reported by the terminal device, or the number of antenna ports for each SRS resource in a sounding reference signal (SRS) resource set that is configured by the network device based on the working mode;
wherein the power scaling coefficient is determined in the following manner:
if the power control factor satisfies the following condition, determining the power scaling coefficient to be 1;
part of radio frequency branches of the terminal device supports full-power transmission, the number of antenna ports for each SRS resource in the SRS resource set is different, and the TPMI delivered by the network device falls within the TPMI reported by the terminal device; wherein
the full-power transmission is transmission based on a maximum transmit power of the terminal device.

6. The terminal device according to claim 5, wherein the uplink full-power transmission capability is determined in any one of the following manners:
reporting the uplink full-power transmission capability; or
reporting the uplink full-power transmission capability, and receiving an uplink full-power transmission indication delivered by the network device, wherein the uplink full-power transmission indication is used to indicate that the terminal device is to use an uplink full-power transmission mode for uplink transmission.

7. The terminal device according to claim 5, wherein the computer program instruction is further executed by the processor to implement:
if the uplink full-power transmission capability of the terminal device is that none of radio frequency branches supports full-power transmission or part of radio frequency branches supports full-power transmission, and an uplink transmission rank of the terminal device is equal to the number of uplink transmission antenna ports of the terminal device, performing uplink transmission based on the uplink transmit power according to a precoding codebook delivered by the network device; wherein the precoding codebook is determined based on the number of uplink transmission antenna ports of the terminal device, the uplink transmission rank, and the number of antenna ports for each SRS resource in the SRS resource set.

8. The terminal device according to claim 5, wherein the computer program instruction is further executed by the processor to implement:

if the number of antenna ports for each SRS resource in the SRS resource set configured by the network device is different, and an uplink transmission rank of the terminal device is less than the number of uplink transmission antenna ports of the terminal device, performing uplink transmission based on the uplink transmit power in an SRS resource transmission mode corresponding to the number of antenna ports of an SRS resource that is the same as the uplink transmission rank.

9. A network device, comprising:

a memory, storing a computer program instruction; and a processor, wherein the computer program instruction is executed to implement:

receiving uplink data sent by a terminal device, wherein the uplink data is transmitted on uplink by the terminal device based on an uplink transmit power obtained through scaling by a power scaling coefficient, and the power scaling coefficient is determined based on a power control factor; wherein the power control factor comprises at least one of the following: an uplink full-power transmission capability of the terminal device, a supported transmission precoding matrix indicator (TPMI) reported by the terminal device, a TPMI delivered by the network device, a working mode reported by the terminal device, or the number of antenna ports for each SRS resource in a sounding reference signal (SRS) resource set that is configured by the network device based on the working mode;

wherein the power scaling coefficient is determined in the following manner:

if the power control factor satisfies the following condition, determining the power scaling coefficient to be 1; part of radio frequency branches of the terminal device supports full-power transmission, the number of antenna ports for each SRS resource in the SRS resource set is different, and the TPMI delivered by the network device falls within the TPMI reported by the terminal device; wherein the full-power transmission is transmission based on a maximum transmit power of the terminal device.

10. The network device according to claim 9, wherein the computer program instruction is further executed by the processor to implement:

before the receiving uplink data sent by a terminal device, if none of radio frequency branches of the terminal device supports full-power transmission or part of radio frequency branches supports full-power transmission, delivering a TPMI to the terminal device, wherein the delivered TPMI is used to indicate that the terminal device is to perform uplink transmission based on a precoding codebook that is determined based on an uplink transmission parameter; wherein the uplink transmission parameter comprises the number of uplink transmission antenna ports of the terminal device, an uplink transmission rank, and the number of antenna ports for each SRS resource in the SRS resource set configured by the network device; and the full-power transmission indicates transmission performed based on a maximum transmit power of the terminal device.

11. The network device according to claim 10, wherein the precoding codebook is determined in the following manner:

if the number of antenna ports for each SRS resource in the SRS resource set is the same, the number of uplink transmission antenna ports is 2, and the uplink transmission rank is 1, determining the precoding codebook to be:

$$\frac{1}{\sqrt{2}}\begin{bmatrix}1\\1\end{bmatrix};$$

or a fully coherent codebook, a partially coherent codebook, and a non-coherent codebook.

12. The network device according to claim 10, wherein the precoding codebook is determined in the following manner:

if the number of antenna ports for each SRS resource in the SRS resource set is the same, the number of uplink transmission antenna ports is 4, and the uplink transmission rank is 1, determining the precoding codebook to be:

$$\frac{1}{2}\begin{bmatrix}1\\1\\1\\-1\end{bmatrix} \text{ or } \frac{1}{2}\begin{bmatrix}1\\1\\1\\1\end{bmatrix}; \text{ or}$$

$$\frac{1}{2}\begin{bmatrix}0\\1\\0\\1\end{bmatrix}; \text{ or}$$

$$\frac{1}{2}\begin{bmatrix}1\\0\\1\\0\end{bmatrix};$$

or a fully coherent codebook, a partially coherent codebook, and a non-coherent codebook.

13. The network device according to claim 10, wherein the computer program instruction is further executed by the processor to implement:

when the uplink full-power transmission capability reported by the terminal device is received, delivering an uplink full-power transmission indication to the terminal device, wherein the uplink full-power transmission indication is used to indicate that the terminal device is to use an uplink full-power transmission mode for uplink transmission.

14. The network device according to claim 13, wherein the computer program instruction is further executed by the processor to implement:

delivering the uplink full-power transmission indication through radio resource control (RRC), medium access control (MAC), or downlink control information (DCI); or delivering a full-power transmission TPMI; or configuring, for the terminal device, an SRS resource corresponding to the precoding codebook, wherein the number of antenna ports of the configured SRS resource is the same as the number of non-zero antenna ports indicated by the precoding codebook; wherein the non-zero antenna port means that row values of a precoding codebook corresponding to the antenna port are all non-zero.

15. The network device according to claim 10, wherein the precoding codebook is determined in the following manner:

if the number of antenna ports for each SRS resource in the SRS resource set is the same, the number of uplink transmission antenna ports is 4, and the uplink transmission rank is 2, determining the precoding codebook to be:

$$\frac{1}{2}\begin{bmatrix} 1 & 0 \\ 0 & 1 \\ 1 & 0 \\ 0 & -j \end{bmatrix};$$

or a fully coherent codebook, a partially coherent codebook, and a non-coherent codebook.

16. The network device according to claim 10, wherein the precoding codebook is determined in the following manner:

if the number of antenna ports for each SRS resource in the SRS resource set is the same, the number of uplink transmission antenna ports is 4, and the uplink transmission rank is 3, determining the precoding codebook to be:

$$\frac{1}{2}\begin{bmatrix} 1 & 0 & 0 \\ 0 & 1 & 0 \\ 1 & 0 & 0 \\ 0 & 0 & 1 \end{bmatrix};$$

or a fully coherent codebook, a partially coherent codebook, and a non-coherent codebook.

17. The network device according to claim 10, wherein the precoding codebook is determined in the following manner:

if the number of antenna ports for each SRS resource in the SRS resource set is different, the number of uplink transmission antenna ports is 4, and the SRS resource set comprises two SRS resources, with one SRS resource comprising one antenna port and the other SRS resource comprising four antenna ports, then:

if the uplink transmission rank is 2, determining the precoding codebook to be:

$$\frac{1}{2}\begin{bmatrix} 1 & 0 \\ 0 & 1 \\ 1 & 0 \\ 0 & -j \end{bmatrix};$$

or a fully coherent codebook, a partially coherent codebook, and a non-coherent codebook; or if the uplink transmission rank is 3, determining the precoding codebook to be:

$$\frac{1}{2}\begin{bmatrix} 1 & 0 & 0 \\ 0 & 1 & 0 \\ 1 & 0 & 0 \\ 0 & 0 & 1 \end{bmatrix};$$

or a fully coherent codebook, a partially coherent codebook, and a non-coherent codebook.

18. The network device according to claim 10, wherein the precoding codebook is determined in the following manner:

if the number of antenna ports for each SRS resource in the SRS resource set is different, the number of uplink transmission antenna ports is 4, the uplink transmission rank is 3, and the SRS resource set comprises three SRS resources, with one SRS resource comprising one antenna port, a second SRS resource comprising two antenna ports, and a third SRS resource comprising four antenna ports, determining the precoding codebook to be:

$$\frac{1}{2}\begin{bmatrix} 1 & 0 & 0 \\ 0 & 1 & 0 \\ 1 & 0 & 0 \\ 0 & 0 & 1 \end{bmatrix};$$

or a fully coherent codebook, a partially coherent codebook, and a non-coherent codebook.

* * * * *